United States Patent [19]

Cloud, Jr. et al.

[11] Patent Number: 4,654,528

[45] Date of Patent: Mar. 31, 1987

[54] RADIATION LEVEL REPORTING SYSTEM

[75] Inventors: James M. Cloud, Jr.; William R. Weideman, both of Greenville, Tex.

[73] Assignee: E-Systems, Inc., Dallas, Tex.

[21] Appl. No.: 834,121

[22] Filed: Feb. 26, 1986

Related U.S. Application Data

[63] Continuation of Ser. No. 667,068, Nov. 1, 1984, abandoned, which is a continuation of Ser. No. 298,979, Sep. 3, 1981, abandoned.

[51] Int. Cl.⁴ .................. G01S 13/80; G08C 17/00; G21C 17/00; H04B 1/59
[52] U.S. Cl. .................. 250/336.1; 250/388; 73/35; 340/870.16; 340/870.26; 342/50; 367/2; 376/247; 376/254
[58] Field of Search ............... 73/35, 167, 387, 432 R; 250/252.1, 253, 336.1, 388, 394; 340/505, 519, 521, 522, 539, 600, 626, 825.54, 870.1, 870.16, 870.18, 870.26, 870.27, 870.28; 343/6.5 R, 6.5 LC, 6.5 SS, 6.8 R, 6.8 LC, 460; 367/2, 3, 4, 6, 140, 178, 191; 181/122, 108, 109; 376/245, 247, 254, 259; 342/50

[56] References Cited

U.S. PATENT DOCUMENTS

| | | | |
|---|---|---|---|
| 2,613,347 | 10/1952 | Todd | 340/870.1 X |
| 2,618,962 | 11/1952 | Plumley et al. | 73/35 |
| 2,703,367 | 3/1955 | Florman | 250/388 |
| 2,830,191 | 4/1958 | McCollum et al. | 73/35 |
| 2,917,633 | 12/1959 | Richards | 340/870.28 X |
| 2,965,878 | 12/1960 | Ohlund | 367/191 |
| 2,992,417 | 7/1961 | Hoefs et al. | 340/870.28 X |
| 3,063,048 | 11/1962 | Lehan et al. | 343/6.5 R X |
| 3,091,463 | 5/1963 | Cohen et al. | 250/252.1 X |
| 3,108,466 | 10/1963 | Sander et al. | 73/35 |
| 3,148,618 | 9/1964 | Richard | 367/4 X |
| 3,182,315 | 5/1965 | Sweeny | 343/6.5 R X |
| 3,226,546 | 12/1965 | Furman | 73/35 X |
| 3,254,219 | 5/1966 | Fihlay et al. | 73/35 |
| 3,336,807 | 8/1967 | Van Lint et al. | 73/35 X |
| 3,357,007 | 12/1967 | Witte et al. | 340/870.28 X |
| 3,474,405 | 10/1969 | Padberg, Jr. | 340/539 X |
| 3,517,316 | 6/1970 | Anderson et al. | 340/539 X |
| 3,750,166 | 7/1973 | Dearth | 343/6 TV |
| 3,751,984 | 8/1973 | Rennie | 73/432 R X |
| 3,982,243 | 9/1976 | Gustavsson et al. | 343/6.5 R X |
| 4,031,513 | 6/1977 | Simciak | 343/6.5 LC |
| 4,106,343 | 8/1978 | Cook | 73/387 |
| 4,152,600 | 5/1979 | Berry | 250/252.1 |
| 4,278,976 | 7/1981 | Apers et al. | 343/6.5 R |

FOREIGN PATENT DOCUMENTS

| | | | |
|---|---|---|---|
| 2029161 | 12/1970 | Fed. Rep. of Germany | 250/388 |
| 80/02877 | 12/1980 | PCT Int'l Appl. | 343/6.5 R |

OTHER PUBLICATIONS

Holter, Norman J., Measurement of Ocean Waves Generated by Atomic Bombs, Electronics, May 1946, pp. 94–98.

Glasstone, Samuel, The Effects of Nuclear Weapons, Feb. 1964, pp. 653–657, 682–698.

John W. Wasik, Undersea Transmitters to Locate Missile Impacts, Electronics, vol. 36, No. 7, Feb. 15, 1963, p. 18.

Primary Examiner—Charles T. Jordan
Assistant Examiner—Brian S. Steinberger
Attorney, Agent, or Firm—Albert M. Crowder, Jr.

[57] ABSTRACT

A remote sensing transponder system is disclosed including apparatus for sensing gamma radiation levels proximate thereto, generating a signal indicative of the sensed radiation level, and transmitting an RF Signal modulated with the generated signal to a remote receiver in response to an interrogation signal from the receiver. The transponder further includes a pressure sensing device for sensing overpressure shockwaves such as caused by a nuclear blast and further modulating the transmitted RF Signal to indicate the detection of such a shockwave.

5 Claims, 4 Drawing Figures

RADIATION LEVEL REPORTING SYSTEM

This is a continuation of application Ser. No. 667,068 filed Nov. 1, 1984, now abandoned, which is a continuation of application Ser. No. 298,979 filed Sept. 3, 1981, now abandoned.

TECHNICAL FIELD

The present invention pertains to the field of remote sensing transponders and in particular to an interregator-responder signaling system for remotely sensing and transmitting preselected parameters.

BACKGROUND ART

In the event of general nuclear war all strageic airborne elements of the Air Force, including reserve forces, will eventually need a recovery airfield if they are to be retained as assets. One major problem that surviving command and control elements and the force elements themselves have, will be the location of suitable airfields to be used as recovery bases. Starting in the early post-attack period of a general nuclear war, aircraft which are acting under the direction of command and control elements, or, in some cases aircraft that are acting alone will begin collecting information as to the status of all candidate recovery airfields.

In the case of the military need for the status of recovery airfields, the information required from the field is the result of nuclear events affecting the airfield, such as, ground radiation level, likelyhood of blast damage, etc. In addition, aircraft attempting to use the field will require a positve means of locating the field in a timely manner where normal ground navigation aids may be inoperative.

In the case of civil need, the same nuclear effects information is required. Additional information such as quantity and status of logistic assets may also be required.

Because of the nature of the nuclear effects about which information is required and the austere environment of the post-attack period, it is desirable to determine the field status remotely without the need to send survey teams directly to those locations. It is also important to have a system which will provide the status information only to those personnel who are authorized to have it.

In view of the above, there exists a need for a simplified system which would provide limited status reporting capability and can interface with an aircraft flying in the vicinity of a potential recovery airfield. This system would provide aircraft personnel with the status of current radiation level and possible surface nuclear effects such as blast overpressure.

SUMMARY OF THE INVENTION

The present invention provides a method and apparatus which could be integrated into existing airbourne communications systems for use in determining radiation levels and possible nuclear blast occurances in the vicinity of recovery airfields. A transponder is provided which contains a radiation detector and a pressure sensor. The transponder is positioned on the ground adjacent to the recovery airfield with the radiation detector monitoring radiation levels and initiating generation of a preselected tone relating to the magnitude of the measured radiation level.

A conventional airbourne system of an aircraft could be modified to include apparatus of the present invention for interrogating the transponder to determine such monitored surface radiation levels.

Upon receipt of an interrogation signal, the transponder's transmitter will reply with a signal compatible with the airbourne communications system but impressed with the preselected signal indicative of the radiation level magnitude.

Additionally, a pressure sensor having a threshold set to be activated on the occurance of nuclear blast overpressures will, upon detection of such overpressure, generate a second different modulating signal indicating that possible nuclear blast damage has occured in the vicinity of the airfield.

As some recovery airfields may be in remote and uninhabited areas, the apparatus may be supplied in a parachute-deliverable package which would permit aircraft personnel to perform an air drop to position the equipment adjacent to the airfield, after which the above described radiation measurement and interrogation would occur.

Accordingly, it is a feature of the present invention to provide a method and apparatus to determine the presence of radiation adjacent to a recovery airfield.

Another feature of the present invention is to provide a method and apparatus for detecting nuclear blast overpressures indicative of damage to the airfield.

Yet another feature of the present invention is to provide an automated method and apparatus for measuring radiation and detecting pressure levels which may be incorporated into existing airborne communications equipment such as that found on the type of aircraft utilizing the recovery airfield.

These and other features and advantages of the present invention will become apparent from the following detailed description when considered in conjunction with the accompanying drawings.

BRIEF DESCRIPTION OF THE DRAWING

In order that the manner in which the above-recited advantages and features of the invention are attained can be understood in detail, a more particular description of the invention may be had by reference to specific embodiments thereof which are illustrated in the appended drawings which form a part of this specification. It is to be noted however, that the appended drawings illustrate only typical embodiments of the invention and therefore are not to be considered limiting of its scope when the invention may admit to further equally effective embodiments.

In the drawings.

DETAILED DESCRIPTION

Figure 1A:
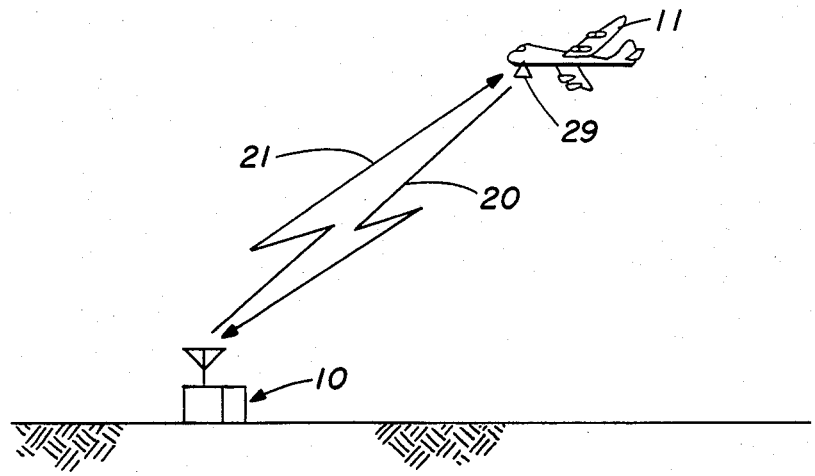
FIG. 1A is a pictoral representation of the interrogation/response transmission links between an aircraft and a transponder incorporating the present invention.

In the following description, like reference numerals refer to like elements throughtout the various views of the drawings.

It is envisioned that the present invention will be incorporated into existing air navigation marker beacon systems. Such marker beacons normally serve to identify a particular location in space along an airway or on the approach of an instrumented runway. This is done by means of a 75 MHz transmitter which continually transmits a directional signal to be received by aircraft flying overhead. These markers are generally used in conjunction with enroute navigation aids and Instrument Landing Systems as point designators. Practice of the invention requires that an aircraft communications radio transmit a preselected interrogation signal, and, upon such transmission, receive via a response an indication of the surface radiation level at preselected airfields while flying overhead within transmission range of a transmitter located proximate to the airfield. Accordingly, the present invention is intended to be used primarily during the post-attack period of a nuclear war, except for brief test periods. Additionally, as in all likelihood the airfield may be damaged by an overpressure shock wave from a nearby nuclear detonation, the marker beacon system should also be modified to detect such over shock waves as an indication of blast damage and transmit that information along with the radiation level information.

Figure 1B:
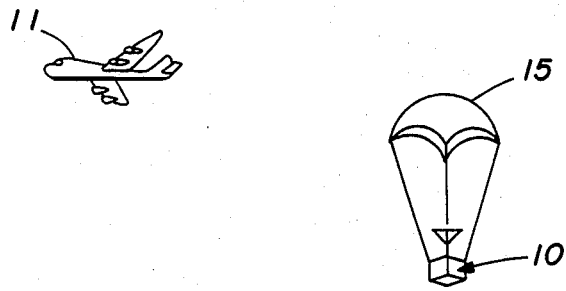
FIG. 1B is a pictoral representation of the parachute air delivery aspect of the present invention.

Referring now to FIGS. 1A and 1B, there is shown an embodiment of the present invention consisting of a crossband transponder 10, and an aircraft 11 equipped with (see FIG. 2) a marker beacon receiver 41 and communications radio 40 forming an airborne communications system 12. A crossband transponder can be generally defined as a transmitter-receiver capable of accepting the challenge of an interrogating signal and automatically transmitting a reply in a different frequency band from that of the received interrogation. In one embodiment of the present invention, the aircraft radio 40 transmits an interrogation signal via RF down link 20, on a preselected frequency, to the transponder 10 which, if it receives and accepts this interrogation signal, will then transmit a 75 MHz signal encoded with radiation level data via RF up link 21 back to the aircraft 11. Aircraft beacon receiver 41 then indicates the radiation level on an ennunciator panel 42 and/or as an aural tone over the crew interphone system 43.

The ground transponder 10 is to be located near ground level at designated airfields. Accordingly, transponder 10 may be emplaced permanently at the airfield or, as shown in FIG. B, airdropped using a parachute delivery system 15 to a position adjacent to the airfield of interest. By use of the air delivery method, the aircraft commander is given greater flexibility in his choice of recovery airfields. Additionally, the number of permanent emplacements of the system required to provide sufficient recovery airfields can be greatly reduced. The aircraft 11 must fly within radio range of the transponder 10 for interrogation. The RF link 20 from the aircraft 11 to the transponder 10 should closely match, in sensitivity, the return RF link 21 from the transponder 10 to the aircraft 11 for satisfactory operation. The operational range of the RF link may be any distance from 50 to 200 statute miles and will depend on the power output of the specific transmitting equipment and associated antennas as well as the sensitivity of the receiver equipment and their associated antennas.

Figure 3:
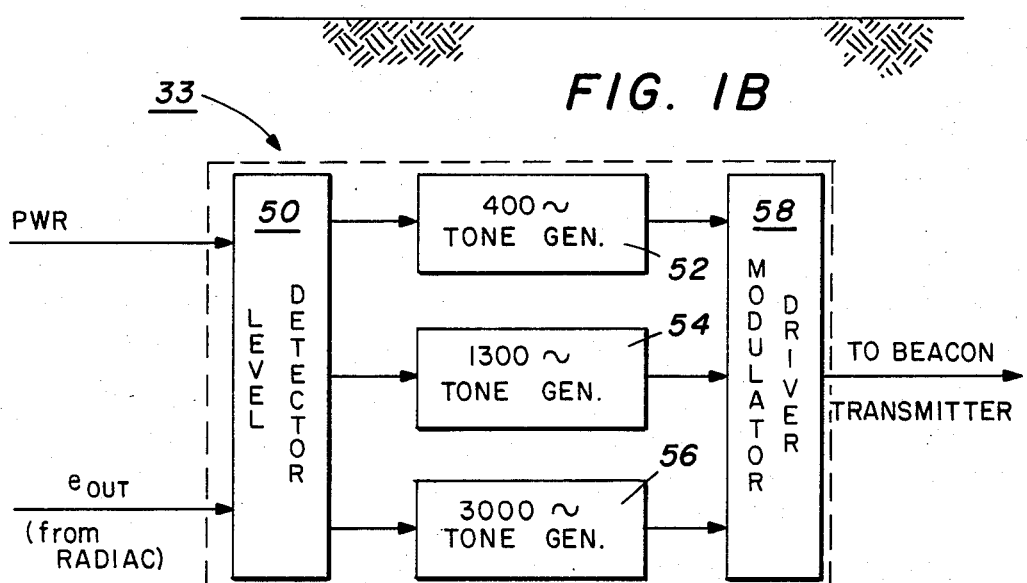
FIG. 3 is a simplified block diagram showing the interface between the radiation level detector and the transponder transmitter and indicating the various modulating tones utilized to indicate radiation levels detected by the present invention.
Figure 2:
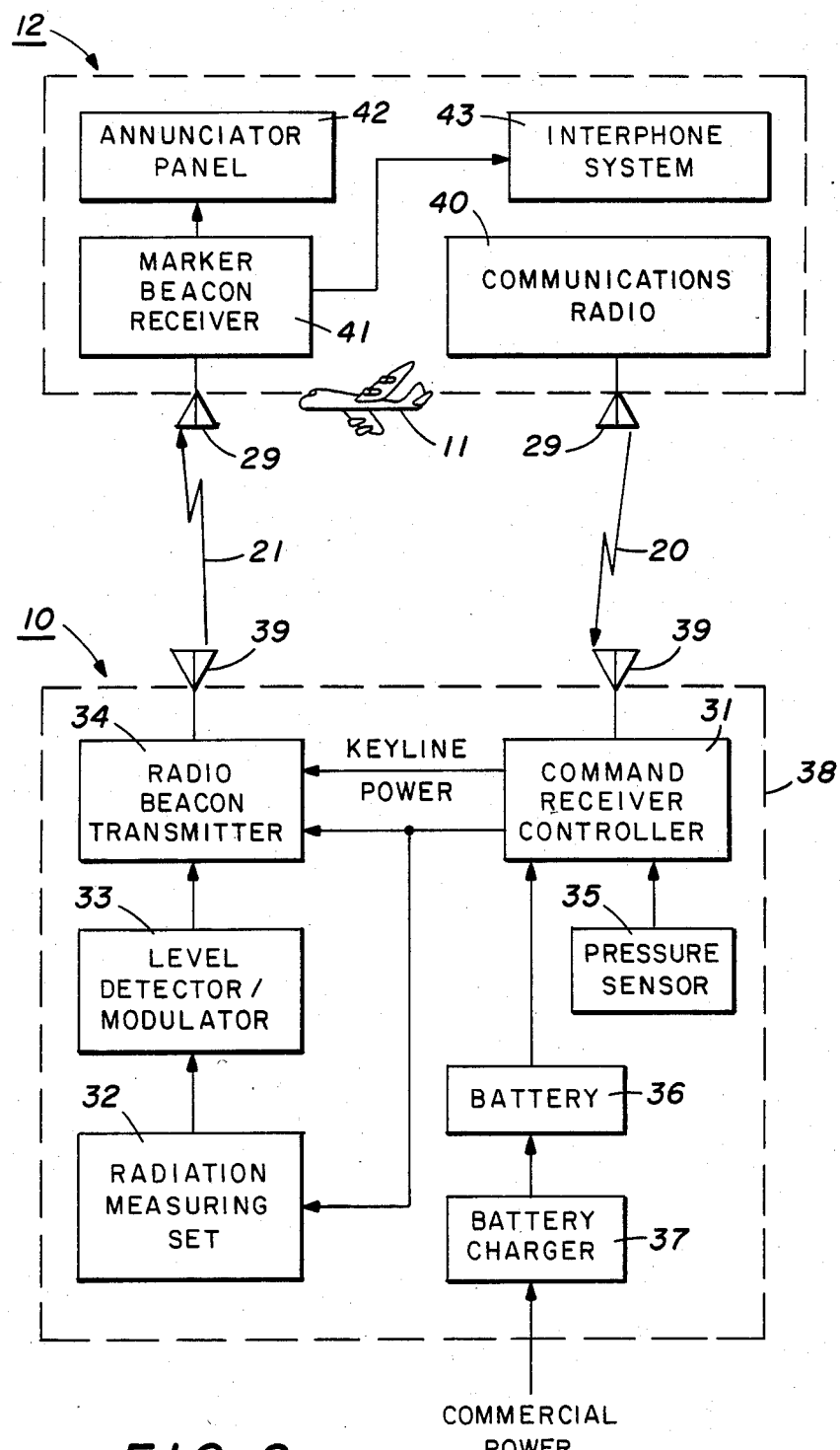
FIG. 2 is a simplified block diagram showing the transponder and interrogator portions of the present invention and indicating the transmission directions of the interrogation/response communications links.

Referring now to FIG. 2, the transponder 10 consists of a command receiver/controller 31 which decodes and initiates a response to a correct interrogation signal from the aircraft 11. Transponder 10 additionally initiates a power on sequence for turning on other system elements including a radiation measuring device 32 designated to measure gamma radiation. A level detector/ modulator 33 for receiving the output of the radiation measuring set 32 (as will be hereinafter described in greater detail) and generating one of three preselected tones as a modulating signal (FIG. 3).

There is included a radio beacon transmitter 34 to accept the tone modulation from modulator driver 58 and radiate a 75 MHz RF signal, modulated by the preselected modulating signal, to the aircraft 11. Transponder 10 further includes a pressure sensor 35 as well as a battery 36 energizing a suitable power supply (not shown) to supply power for the transponder. If transponder 10 is set up in a permanent emplacement a battery charger 37 is supplied and connected to commercial AC power to keep the battery charged to capacity. Alternatively, for a permanent emplacement the battery 36 and charger 37 may be with power supply (not shown) connected directly to a commercial AC power source.

When the transponder 10 is configured for air delivery as shown in FIG. 1b, the system is also operated by a primary battery 36 energizing the power supply. However, in this case the charger 37 is not required and may not be supplied. The transponder 10 elements are intended to be housed in an air-deliverable environmental enclosure 38.

In operation, the interrogation sequence begins with the operator in the aircraft 11. The operator selects the predetermined frequency of the transponder 10 on a communications radio 40. The operator then initiates transmission of the proper interrogation code from radio 40. The interrogation code signal is transmitted between antenna 29 via link 20 to antenna 39 of transponder 10. It should be noted that the interrogation code can be made as simple or complex as required.

When the correct interrogation signal is received and decoded at the transponder 10 by the command receiver/controller 31 through omnidirectional antenna 39, the following sequence takes place. Power is supplied to the radiation measuring set 32, level detector/modulator 33, and radio beacon transmitter 34. Upon power application, the radiation measuring set 32 initiates a measurement to determine the current level of gamma radiation in the vicinity of transponder 10 and outputs a analog voltage proportioned to the measured gamma radiation level. Level detector/modulator 33 receives and the analog signal from the radiation measuring set 32 and couples the signal into a level detector section 50 (see FIG. 3). Dependent upon the measured radiation level, the analog signal actuates one of three fixed frequency tone modulation signal generators, 52, 54 and 56, having frequencies of 400 hz, 1300 hz and 3000 hz. respectively with the tone frequency corresponding to measured radiation levels whereby a 400 hz tone indicates the measured level is within first preselected range such as 10 to 40 radiation units, a 1300 hz tone indicates the measured level is in a second preselected range i.e., greater than 40 radiation units and a 3000 hz tone indicates the measured level is within a third preselected range that is less than 10 radiation units. These unit levels are used to determine safe exposure times of the aircraft personnel to the measured radiation with a range of 40 units and up being arbitrarily selected as completely unsafe for average exposure.

After a fixed time delay, such as a 30-seconds following receipt of the interrogation signal, the command receiver controller 31 keys the radio beacon transmitter 34. A 75 MHz RF carrier modulated with the activated tone from one of the tone generators 52, 54 and 56, is then transmitted for a preselected limited time period, such as 30 seconds, to the aircraft 11 from omnidirectional bipole antenna 39 over RF link 21.

If, however, the pressure sensor 35 has been previously exposed to an overpressure greater than a preset value, the command receiver/controller 31 will cause the transponder 10 to so indicate by either not responding to interrogation or by transmitting some preselected indicating signal.

The radiation data encoded signal is then transmitted to aircraft 11, where the marker beacon receiver 41 detects the 75 MHz signal and decodes the tone modulation present on the carrier. This tone is then introduced into the crew interphone system 43. Certain models of marker beacon receivers also have an output signal to an annunciator panel 42. This output signal may be used to illuminate an individual light on the panel corresponding to one of the three possible tones received. When a steady light or tone is present for a preselected time period, such as 30 seconds, this indicates the range that the radiation level proximate to the airfield falls within. For example, if the proper indicator is illuminated and a continuous 3,000 cycle tone is heard then the radiation level can be assumed to be in the range of 0 to 10 units. If a second, different indicator is illuminated and a continuous 400 cycle tone is heard then radiation level is in the range of 10 to 40 units. However if a still different indicator is illuminated and a continuous 1,300 cycle tone is heard the radiation level is 40 units or greater.

Although specific embodiments have been described in detail hereinbefore, it is understood that the subject invention is not limited therto and all variations and modifications thereof are contemplated and are included within the scope of the invention as defined by the appended claims.

We claim:

1. A method for determining nuclear radiation levels and remotely indicating such levels prior to human exposure to such nuclear radiation, comprising the steps of:
   transmitting a preselected interrogation code from a remote location to a receiving nuclear radiation detector station located proximate an area in which nuclear radiation levels are to be measured;
   in response to reception of the preselected interrogation code identified with the receiving detector station, remotely actuating the nuclear radiation detector station to detect surrounding radiation levels;
   comparing the surrounding detected radiation levels with a plurality of preselected nuclear radiation reference levels;
   in response to said comparison, actuating one of a plurality of frequency generators each identified with a set range of radiation levels in the nuclear radiation detector station to produce a preselected frequency signal identified with one of said plurality of preselected nuclear radiation reference levels;
   determining whether an over-pressure greater than a preset value has been received by the nuclear radiation detector station;
   if an over-pressure greater than a preset value has been received, transmitting a signal indicative of an over-pressure condition to said remote location;
   transmitting said preselected frequency signal to the remote location for a preselected time period; and
   indicating at the remote location the detected nuclear radiation level corresponding to the preselected frequency signal.

2. The method of claim 1, further including the step of:
   transmitting the interrogation code by means of an airborne communications system.

3. The method of claim 1, further including the steps of:
   transporting the nuclear radiation detector station to said area; and
   delivering said nuclear radiation detector station to said area by parachute delivery.

4. A system for determining nuclear radiation levels and transmitting a signal indicative of such levels prior to human exposure thereto, comprising:
   a nuclear radiation detector station located proximate an area in which radiation levels are to be measured;
   means for transmitting a preselected interrogation code from a remote location to the nuclear radiation detector station;
   means responsive to reception of the preselected interrogation code identified with the detector station for remotely actuating the nuclear radiation detector station to detect surrounding nuclear radiation levels;
   means for comparing the surrounding detected nuclear radiation levels with a plurality of preselected nuclear radiation reference levels;
   means responsive to said comparison means for generating a preselected frequency signal identified with one of said plurality of preselected reference nuclear radiation levels;
   a pressure sensor calibrated to detect an over-pressure greater than a preset value;
   means responsive to the pressure sensor for transmitting a signal indicative of an over-pressure condition to said remote location;
   means for transmitting said preselected frequency signal to the remote location for a preselected time period; and
   means located at the remote location for indicating the detected nuclear radiation level corresponding to the preselected frequency signal.

5. The system of claim 4 wherein said nuclear radiation detector station is assembled into an environmental enclosure for air delivery by parachute drop; and
   a parachute delivery system interconnected to said enclosure.

* * * * *